3,345,227
METHOD OF MAKING PLASTIC CONTAINERS
Robert H. Park, Corporation Road,
Dennis, Mass. 02638
Original application Feb. 3, 1964, Ser. No. 342,032.
Divided and this application Oct. 21, 1965, Ser No. 500,075
2 Claims. (Cl. 156—86)

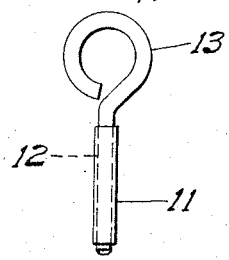
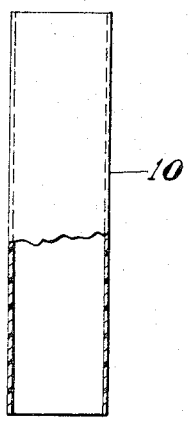
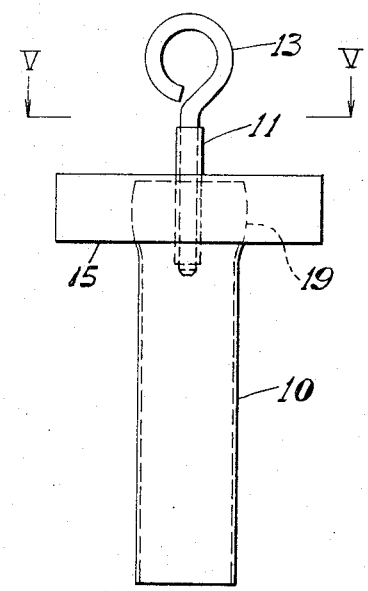
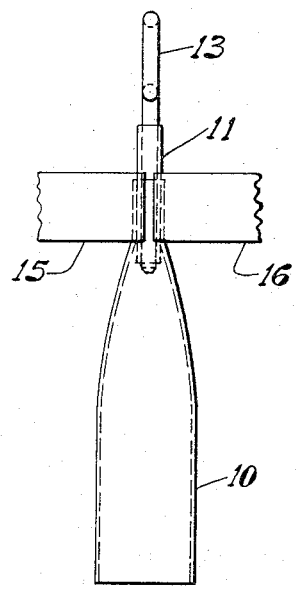
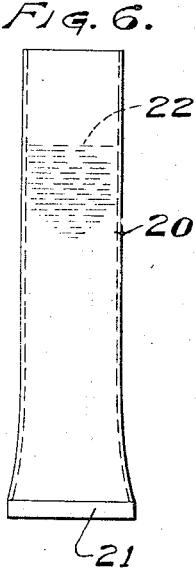
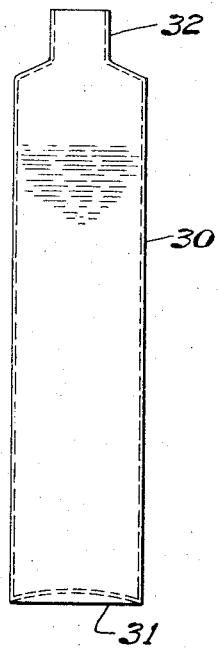
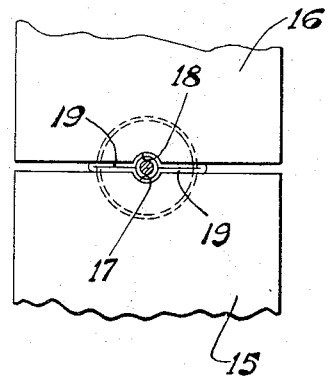
INVENTOR.
ROBERT H. PARK
BY
Christel & Bean
ATTORNEYS United States Patent Office 3,345,227
Patented Oct. 3, 1967

This application is a division of my copending application, Ser. No. 342,032, filed Feb. 3, 1964, entitled "Closure for Plastic Containers."

This invention relates to thermoplastic containers and more particularly to the construction of dispensing orifice means and closures for such containers.

The present invention provides a closure arrangement for thermoplastic containers such as tubes, bags, and the like, wherein a preformed plastic tube is fused into or otherwise intimately joined with the tube or bag structure so as to form an opening into the interior of such structure, together with a metal or plastic plug which comprises a rod fitting closely within the tube and preferably having a tapered or rounded inner end and an enlargement at its outer end to facilitate manual insertion and removal of the plug with respect to the bore of the tube to provide a removable closure for the tube. Thus the tube provides an accurately sized neck portion or neck reinforcement portion for the container.

In addition to the general advantages of the neck construction resulting from the use of a separate prefabricated tube, as will appear more clearly later herein, the present invention provides a novel closure arrangement wherein the stopper is automatically sealed securely against leakage by virtue of the fact that a portion of the tube extends into the interior of the container whereby its periphery is exposed to pressure within the container. Thus any pressure within the container, as when a flexible container is squeezed or otherwise subjected to external pressure, causes the tube to be pressed radially inwardly against the stopper. Therefore, the greater the internal pressure the tighter the seal.

Experience has shown, in this connection, that a container can be produced which is well adapted to the packaging and dispensing of lubricating oil, and which can be positively relied on to prevent leakage, notwithstanding the effects of development of internal pressure due to temperature changes, or the weight of a heavy object applied against the container as for example in transport within a workman's tool box.

A further feature of the present invention which may be availed of resides in employing heat shrinkable plastic tubing for the closure receiving tube. In this case the closure plug or rod may be of a size to fit, initially, rather loosely in the closure receiving tube. After initial insertion heat is applied to the closure receiving tube to cause it to shrink into closely fitting engagement with the stopper rod or plug. This has been found to provide a convenient way of establishing a liquid-tight seal which still permits ready removal and reinsertion of the stopper rod or plug. It is further contemplated that a shrinkable closure tube may be sized by shrinking the same about a mandrel, in which case the mandrel will preferably remain in place in the tubing while the latter is sealed to a container wall, whereupon the mandrel may be removed from the tube and a suitable closure plug may be inserted.

While illustrative embodiments of the principles of the present invention are shown in the accompanying drawing and described in detail in the following specification, it is to be understood that such embodiments are by way of example only and that the scope of the invention is not limited thereto nor otherwise than as defined in the appended claims.

In the drawing:

FIG. 1 is an elevational view of a relatively thin walled thermoplastic tube which is adapted to be fabricated to form a container;

FIG. 2 is an elevational view of a tubular plastic member adapted to form a dispensing neck in such container with a stopper or closure plug shown assembled therein;

FIG. 3 is an elevational view showing the parts of FIGS. 1 and 2 in assembled relation with jaw members for forming one end of the container tube about the tubular neck member;

FIG. 4 is an elevational view of the structure of FIG. 3 taken at right angles thereto;

FIG. 5 is a top plan view of the structure of FIG. 3;

FIG. 6 is an elevational view of a tubular member similar to FIG. 1 but with the bottom thereof closed prior to assembling the neck and closure means therewith; and FIG. 7 is an elevational view of another form of plastic container adapted to be provided with the tubular neck and closure means of the present invention.

Likewise characters of reference denote like parts in the several figures of the drawing, and referring to FIG. 1, the numeral 10 designates a length of thermoplastic tubing which comprises an envelope having at least one open side and adapted to be fabricated to form a container. In the present instance the tubular member or envelope 10 is circular in cross-section but the same way be elliptical or of any other desired form. In FIG. 2 the numeral 11 designates a length of thermoplastic tubing which comprises a neck bushing and the numeral 12 designates a rod member adapted to fit closely within tubing or bushing 11 to close the bore thereof. As shown, rod member 12 is provided with a handle formation 13 at its outer end and is tapered at its inner end to facilitate insertion in the bushing 11.

Referring now to FIGS. 3, 4 and 5, a pair of jaw members 15 and 16 are provided for pressing the upper portions of the plastic tubular envelope member 10 intimately about the neck forming tubular bushing member 11 to effect a fluid tight juncture of these two members. This may be accomplished by employing the combined effects of heat and pressure using techniques well known in the art, but varying in relation to the type of plastic involved. Thus for vinyl tubing cold jaws may be used with a high frequency voltage applied between them and for polyethylene cold jaws may be employed to grip about tubing that has already been preheated, as for example with hot air or by radiant electric heat. Again, for numerous plastics including polyvinyl chloride, polyethylene and nylon, heating and joining may be accomplished vibrating the jaw members at supersonic frequencies while at the same time pressing the jaws together.

The jaws 15 and 16 are formed with arcuate recesses designated 17 and 18, respectively, which press adjacent portions of the upper end of tubing member 10 intimately about tubing 11 and flatten the remaining lateral portions of the upper end of tubular member 10 as shown at 19, to form a fluid type closure at such upper end of the tubing, save only for the dispensing opening provided through the bore of tubing member 11.

It is to be noted particularly that the tubing member 11 projects into the interior of the container in an axial direction substantially beyond the flattened portions 19 whereby such projecting portion of tubing member 11 has an exposed peripheral portion within the container. Experience with vinyl tubing shrunk onto a $\frac{1}{16}''$ stopper rod, and with lubricating oil as the container contents, has established that to avoid marginal sealing performance the extent of projection should be at least $\frac{1}{8}''$. From this experience it may be inferred as a general rule that it would be desirable that the projection should exceed the diameter of the stopper rod by a factor of 2. However, in any event, for any particular container and type of contents the necessary extent of projection can readily be determined empirically. It will further be noted that the stopper rod or plug 12 extends inwardly a distance in excess of the length of tubing member 11 so that the exposed portion of tubing presses against the cylindrical surface of the stopper rod.

As indicated in the preamble hereto this structure results in a positive fluid tight closure which may be attributed to the fact that internal pressure within the container tends to urge the inner end portion of tubing member 11 into intimate sealing contact with closure rod 12.

At this point in the container fabricating process the container, open at its bottom end, may be delivered to the packer who then fills the tube through the bottom and produces a flat seal across the bottom edge by heat sealing, supersonic sealing or otherwise generally in the manner which is common in sealing conventional collapsible thermoplastic tubes.

In the alternative, the tubing member which forms the body of the container may be sealed at its bottom end and filled before the closure tube 11 is applied to the upper end of the tube. FIG. 6 shows a tubing member 20 which may be the same as the tubing member 10 of FIG. 1 excepting that its bottom has been flattened and sealed to form a lower end closure as at 21 and material has been deposited therein as at 22. From this point the application of a closure tube 11 and stopper 12 may be effected in the same manner as described above and illustrated in FIGS. 3, 4 and 5.

FIG. 7 shows a further variation wherein a bottle-like container 30 having a bottom wall 31 and a reduced neck portion 32 is provided for association with a closure tube 11 and stopper 12. The container 30 may be of the usual extruded and blown thermoplastic material and the neck formation 32 may be of any desired size. If neck formation 32 fits closure tubing 11 rather closely, then the lateral wings, such as at 19, which are formed in pressing the neck 32 about the tubing 11 will be rather small in lateral extent. It is to be understood that jaws substantially the same as the jaws 15 and 16 may be employed for pressing the neck formation 32 about tubing 11 and that, apart from the extent of the lateral wings 19, the construction and appearance of the finished upper end of container 30 will be substantially the same as shown in FIGS. 3, 4 and 5.

In each of the embodiments the tube or bushing 11 may be of polyvinyl chloride, polyethylene, nylon or other suitable thermoplastic material and the larger tube or package 10 may be of the same material or a material compatible therewith for heat sealing purposes. Reference has been made to heat shrinking the tube 11 onto the stopper 12 or a suitable mandrel. In this connection for a given type of tubing and plug dimension trials readily show the relation between tubing inside diameter, plug diameter and degree of heating adapted to achieve a fit which will ensure a good seal yet avoid development of so tight a fit on the plug as to interfere with ready plug removal, as desired, to allow dispensing the contents of filled tube.

Polyvinyl chloride and polyethylene tubing are obtainable with ability to shrink up to 50% on heatnig, and such tubing has been found convenient for the purposes of the present application in that the size of the tubing prior to shrinking can be made substantially greater than the diameter of the stopper pin or plug. For example, a $3/32''$ inside diameter tube can be used with a $1/16''$ diameter pin. On the other hand, by use of a closer initial fit prior to shrinkage, tubing which shrinks only 10% or 15% upon heating has been found adequate for the purposes of the present invention.

The stopper rod 12 may be of metal or of other rigid material, including various plastics. In certain instances the heat employed in heat sealing the envelope or tubular member 10 to the tube 11 may serve to shrink the latter to the stopper 12.

What is claimed is:

1. The method of making a plastic container which comprises first disposing a tubular neck bushing of heat shrinkable plastic material and of a wall thickness to be self-sustaining about a mandrel member of a diameter to fit relatively closely in said bushing, then heating said plastic neck bushing to shrink the same tightly about said mandrel, then placing the assembled bushing and mandrel between opposed walls of a thin-walled thermoplastic envelope adjacent to the margins of such opposed walls, then pressing the opposite sides of the envelope with opposed die members to press said wall members against the exterior of said bushing and to press portions of said wall members at opposite sides of said bushing against each other and simultaneously subjecting the wall members to heat, to heat seal the wall members to each other and to the intervening bushing.

2. The method of making a plastic container which comprises first disposing a tubular neck bushing of heat shrinkable plastic material and of a wall thickness to be self-sustaining about a mandrel member of a diameter to fit relatively closely in said bushing, then placing the assembled bushing and mandrel between opposed walls of a thin-walled thermoplastic envelope adjacent to the margins of such opposed walls, then pressing the opposite sides of the envelope with opposed die members to press said wall members against the exterior of said bushing and to press portions of said wall members at opposite sides of said bushing against each other and simultaneously subjecting the wall members and bushing to heat, to heat seal the wall members to each other and to the intervening bushing and simultaneously shrink said bushing tightly about said mandrel.

References Cited

UNITED STATES PATENTS

| | | | |
|---|---|---|---|
| Re. 25,624 | 7/1964 | Stahl | 264—349 X |
| 2,027,962 | 1/1936 | Currie | 264—230 |
| 2,377,532 | 6/1945 | Waters | 264—249 |
| 2,679,469 | 5/1954 | Bedford | 264—249 X |
| 3,163,692 | 12/1964 | Smith et al. | 264—249 |
| 3,172,933 | 3/1965 | Flax | 264—248 |

ROBERT F. WHITE, *Primary Examiner.*

L. S. SQUIRES, R. B. MOFFITT, *Assistant Examiners.*